(12) United States Patent
Roddenbery

(10) Patent No.: US 6,349,497 B1
(45) Date of Patent: Feb. 26, 2002

(54) COLLAPSIBLE SUPPORT BAR AND BIRD HUNTING APPARATUS MADE THEREWITH

(75) Inventor: Edward J. Roddenbery, Columbus, GA (US)

(73) Assignee: Ed Roddenbery, Columbus, GA (US)

( * ) Notice: Subject to any disclaimer, the term of this patent is extended or adjusted under 35 U.S.C. 154(b) by 0 days.

(21) Appl. No.: 09/620,218

(22) Filed: Jul. 20, 2000

(51) Int. Cl.$^7$ .............................................. A01M 31/06
(52) U.S. Cl. ................................................. 43/2; 43/3
(58) Field of Search ........................... 43/2, 3; 119/51, 119/23; 248/156, 125.8, 150, 188.5; 211/7, 8, 125, 172, 171, 204, 205, 206, 195, 123; 47/46, 47, 70

(56) References Cited

U.S. PATENT DOCUMENTS

| 1,793,734 A | | 2/1931 | Cole |
| 2,376,716 A | | 6/1945 | Odin |
| 2,884,729 A | | 5/1959 | Walton |
| 2,980,456 A | * | 4/1961 | McMullin |
| 4,114,927 A | * | 9/1978 | Butcher ........................ 285/7 |
| 4,765,277 A | | 8/1988 | Bailey et al. |
| 5,660,637 A | * | 8/1997 | Dodge ........................ 118/500 |
| 5,740,998 A | | 4/1998 | Lindsay et al. |
| 5,769,368 A | | 6/1998 | Busey |
| 6,213,672 B1 | * | 4/2001 | Varga ........................ 403/109.2 |
| 6,216,382 B1 | * | 4/2001 | Lindaman ........................ 43/2 |
| 6,223,358 B1 | * | 5/2001 | DePietro ........................ 4/498 |

FOREIGN PATENT DOCUMENTS

WO    WO 89/12580    * 12/1989

* cited by examiner

Primary Examiner—Peter M. Poon
Assistant Examiner—Andrea M. Valenti
(74) Attorney, Agent, or Firm—Browdy and Neimark

(57) ABSTRACT

A collapsible support bar comprising an inner bar provided with collapsible buttons which retain two outer portions in place in either the collapsed or extended portions. Both the inner bar and the outer portions are provided with drilled holes into which dowels can be inserted. The inner bar is also provided with a hole which fits over a vertical pole. The collapsible support bar can be used to make an apparatus to lure wild birds by placing the collapsible support bar onto a telescopic vertical pole with an attached stake at the bottom to place the pole firmly in the ground, with decoys inserted into the drilled holes. In other embodiments the top section can include a plurality of arms radiating from a central hub, evocative of the branches if a tree. In yet another embodiment a plurality of poles can be used with collapsible support bars located between each pole.

3 Claims, 4 Drawing Sheets

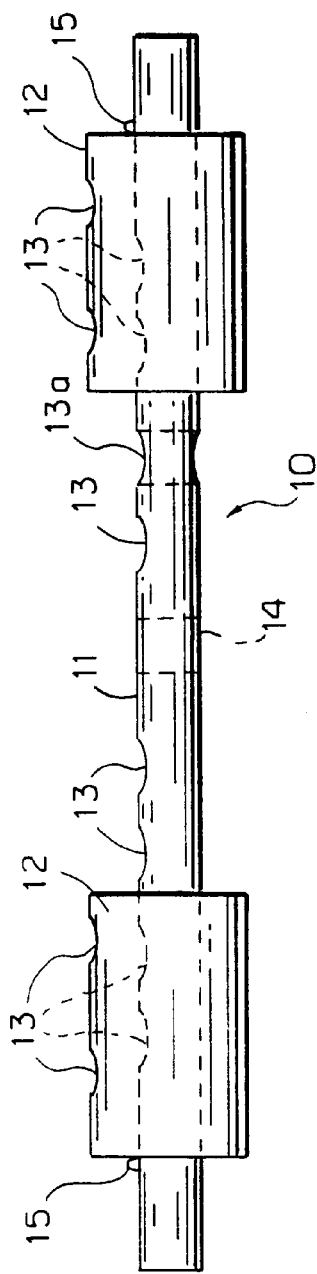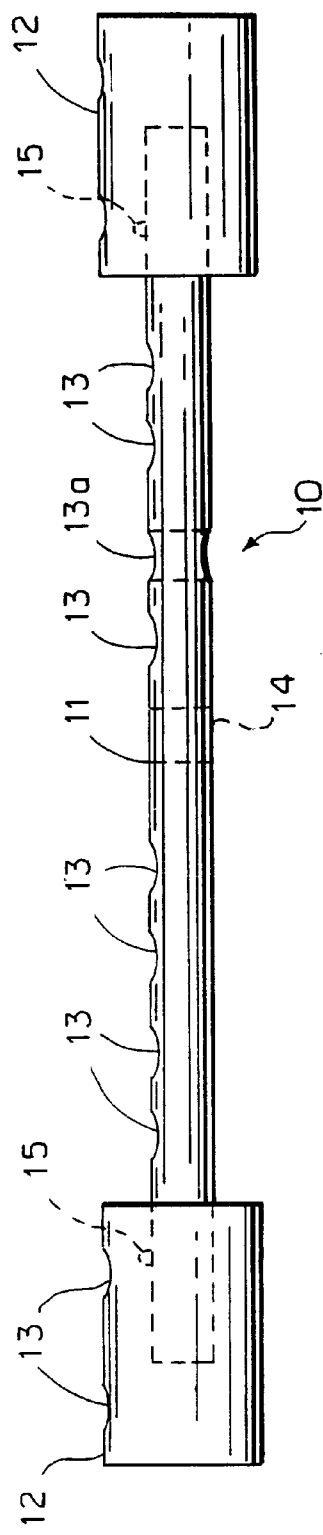

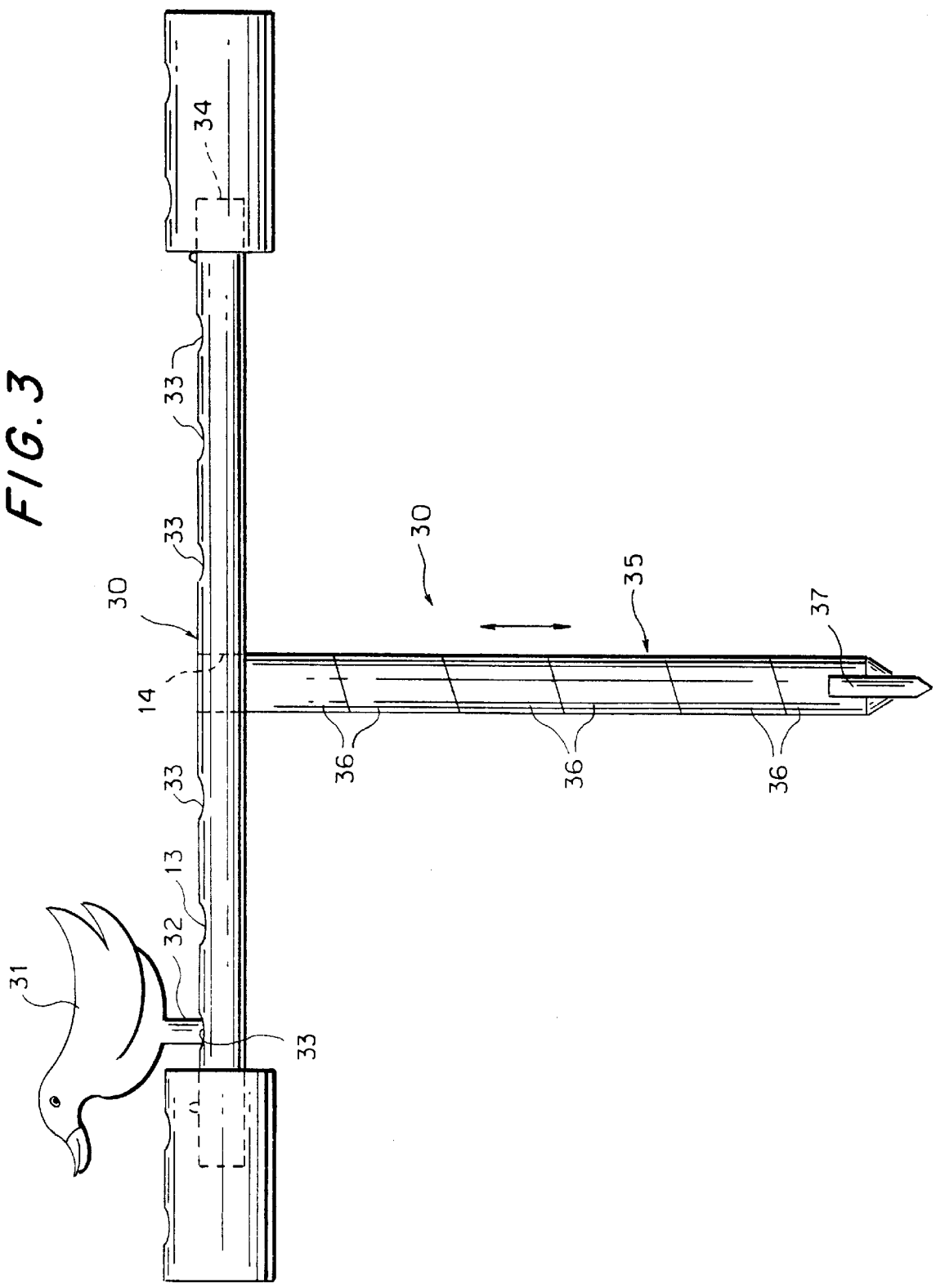

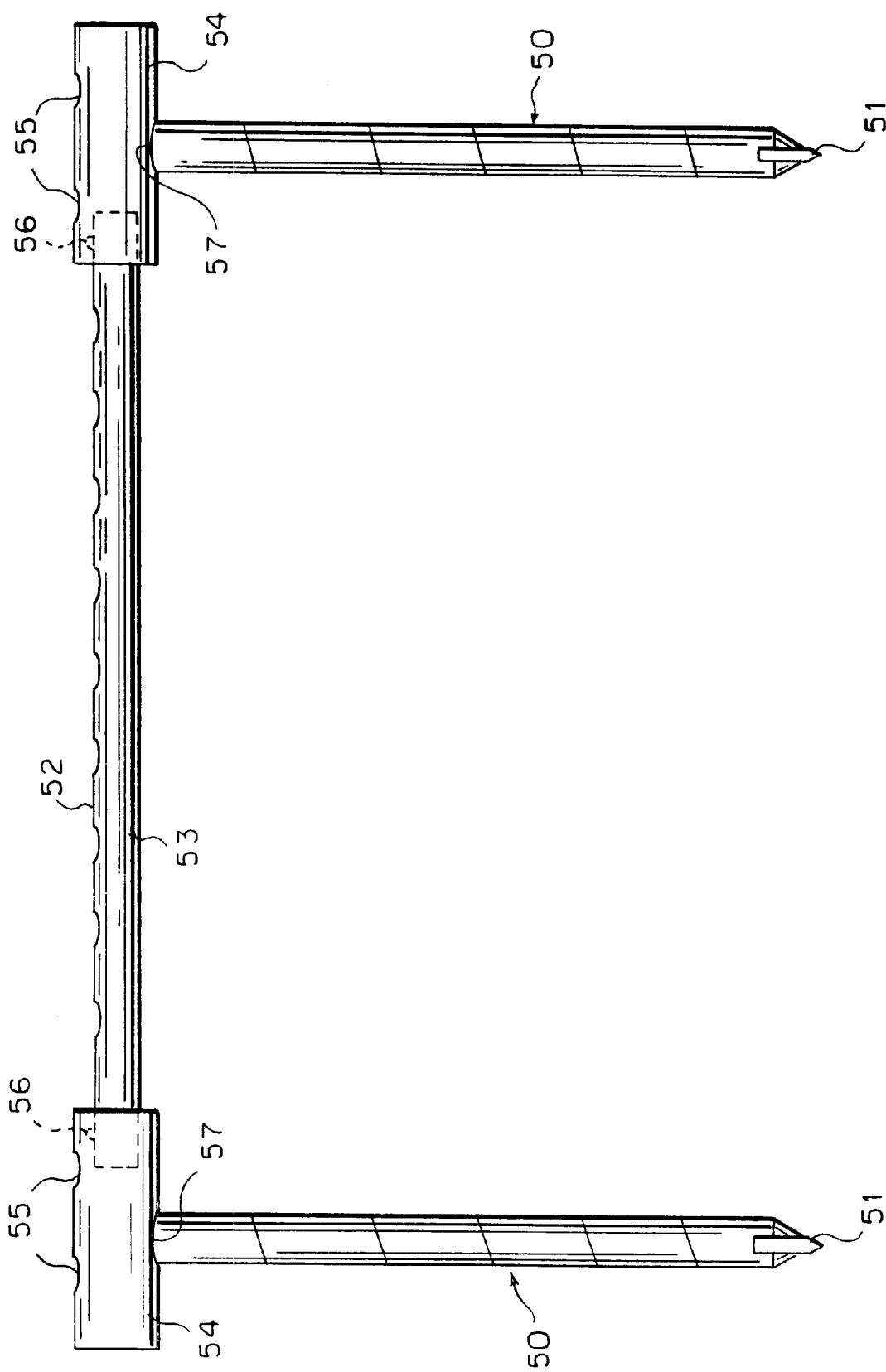

COLLAPSIBLE SUPPORT BAR AND BIRD HUNTING APPARATUS MADE THEREWITH

FIELD OF THE INVENTION

The present invention relates to a support bar and its use in making an apparatus for attracting game birds for hunting of game birds as well as for supporting bird feeders and planters.

BACKGROUND OF THE INVENTION

Wild doves, pigeons, crows, and similar wild birds may be attracted for hunting purposes by mounting decoys at a considerable height above the ground. Conventional bird hunting decoys have been placed in trees in an upright position, which generally required that the hunter climb the tree and suitably clamp the decoys into position. Afterwards, the hunter must again climb the tree to retrieve the decoys.

Walton, in U.S. Pat. No. 2,884,729 and Cole, in U.S. Pat. No. 1,793,734, disclose decoy birds designed to be attached to a support, such as a tree branch or a pole. In both of these cases, the decoys are anchored to the support by means of wires which surround the support means. However, these wires can become bent so that the decoy is no longer in an upright position.

Busey, in U.S. Pat. No. 5,769,368, discloses a drop cloth holder and dispenser having a spine and multiple telescoping arms extending thereon In this device the arms are foldable against the spine from which the arms extend.

SUMMARY OF THE INVENTION

It is an object of the present invention to overcome the deficiencies in the aforesaid prior art.

It is another object of the present invention to provide a support bar which is collapsible and can readily be assembled In an extended position.

It is another object of the present invention to provide a support bar which can be used to construct a support for decoys for hunting birds which can readily be carried by a hunter and assembled on site easily and quickly.

It is a further object of the present invention to provide a support bar which can be used to construct a support for decoys for hunting birds which supports the decoys in an upright position and maintains them in an upright position.

According to the present invention, a support bar is provided which can be mounted horizontally on a vertical support. This support bar is collapsible and can be extended to form a strong, stable horizontal support.

The support bar is particularly useful in producing an apparatus to lure wild birds. Using the support bar of the present invention, an apparatus to lure wild game birds can be constructed comprising a telescopic vertical pole with an attached stake at the bottom to place the pole firmly in the ground. The pole has at least one collapsible horizontal section at the top, made from the collapsible support bar of the present invention, which horizontal section is expandable horizontally to create a T-like structure. In other embodiments the top section can include a plurality of arms radiating from a central hub, evocative of the branches of a tree. In yet another embodiment a plurality of poles can be used with support bars suspended between each pole.

BRIEF DESCRIPTION OF THE DRAWINGS

FIG. 1 shows a support bar according to the present invention in its collapsed state.

FIG. 2 shows a support bar according to the present invention in its extended state.

FIG. 3 shows a bird hunting apparatus made with a support bar according to the present invention.

FIG. 5 shows a third embodiment of a bird hunting apparatus according to the present invention.

DETAILED DESCRIPTION OF THE INVENTION

Figure 4:
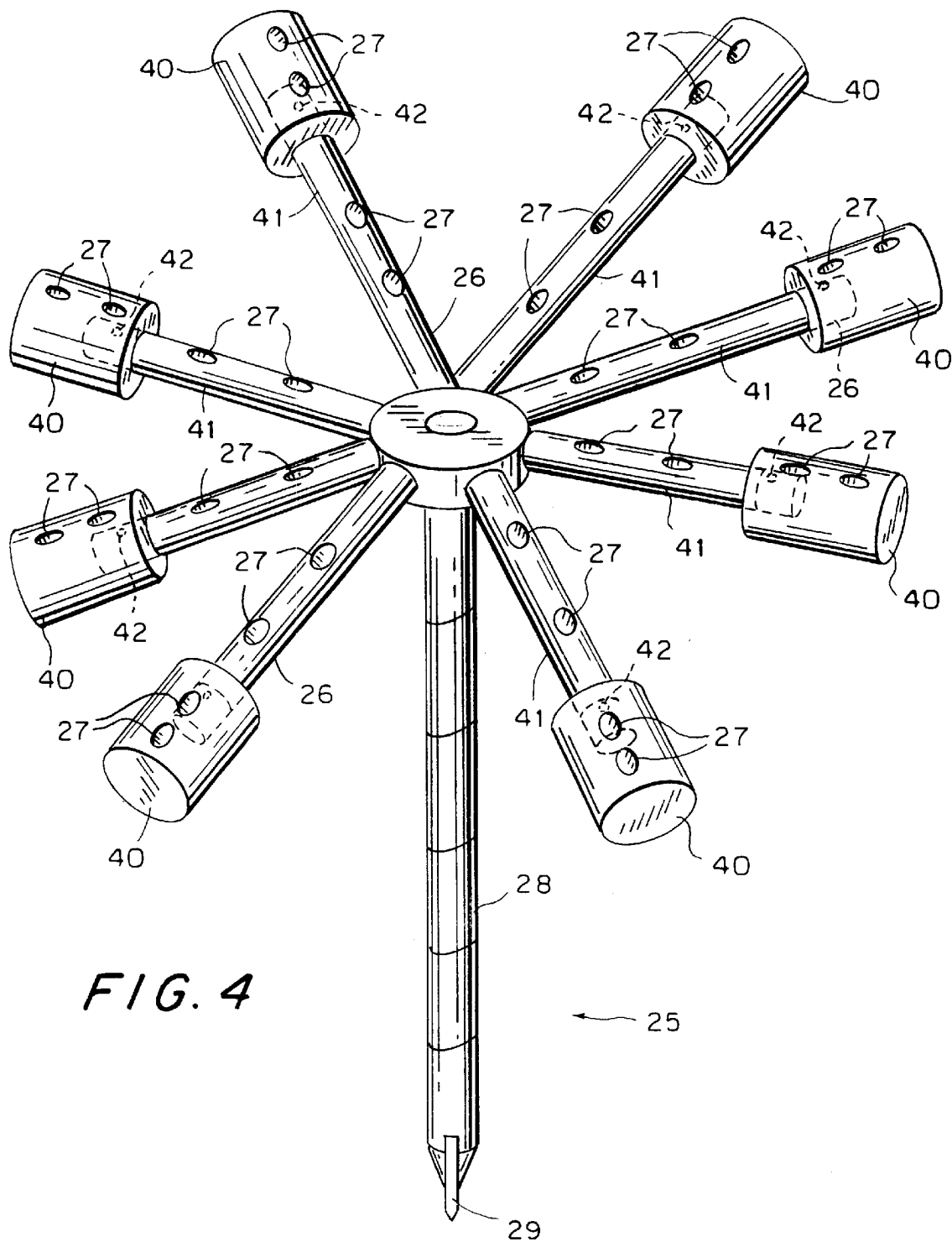
FIG. 4 shows another embodiment of a bird hunting apparatus according to the present invention.

FIG. 1 shows the support bar of the present invention 10 in the collapsed position. Inner bar 11 is provided with collapsible buttons which retain the outer pieces 12 in position on the inner bar. Both the inner bar and the outer pieces are provided with holes 13 into which dowels can be inserted. Drilled holes 13 extend only partially through the inner bar and the outer portions. However, holes 13a can be made to go completely through the inner bar and outer portions. Inner bar 11 is also provided with a hole 14 which fits over a vertical pole.

FIG. 2 shows the support bar of the present invention 10 in the extended position. When the outer members 12 are in the extended position, they are located such that the buttons 15 remain covered by the outer members, so that they provide a means to hold the outer members in place on the inner member 11.

As shown in FIG. 3, the collapsible support can be used to make a bird hunting apparatus. This bird hunting apparatus 30 comprises a decoy body 31 of wood or other material shaped to simulate a wild dove or other animal it is desired to attract. The decoy 31 has a dowel 32 in the bottom thereof to fit into holes 33 drilled in the horizontal portion 34 of the apparatus 30. While a dove is shown as the decoy, any type of bird decoy can be used. The decoy and the dowel thereof can be made of any suitable material, such as wood, plastics, and the like.

The vertical portion 35 of the apparatus is made of tubular sections 36 which can be telescoped into each other. While the vertical portion 35 is preferably made of aluminum, any other suitable material can be used to form the vertical portion. The vertical portion 35 has at the bottom thereof a stake 37 with which the apparatus can be driven into the ground for support.

The tubular sections 36 can be made to fit together and lock in place in a variety of ways, such as by friction fit. Other methods for locking telescoping sections are well renown to those skilled in the art, including resilient elements combined with sleeves as shown in U.S. Pat. No. 2,376,716, to Odin, the entire contents of which are hereby incorporated by reference. Other methods for locking telescoping pole sections together are shown in U.S. Pat. No. 4,765,277, to Bailey et al., the entire contents of which are hereby incorporated by reference. The tubular sections can be made in any desired length, generally about 30–40 inches long. A sufficient number of tubular sections 36 are provided to extend far enough up to attract the bird sought to be hunted. In the case of doves, approximately five to six sections are used to provide an apparatus that extends more than 12 feet above the ground.

While the bird hunting decoy of the present invention can be made of any suitable material, it is preferably made of a material which is rigid when assembled but light enough for a hunter to carry along on a hunting trip. The vertical and horizontal portions are preferably of a color such that will not frighten the prey and will allow the decoys to be displayed in a natural-looking setting.

The horizontal section 34 of the decoy holder 30 is made from a collapsible support. As shown in FIGS. 1–2, a drilled hole 14 is provided in the center of the collapsible support so that the horizontal section 34 can be attached to the vertical section 35. As shown in FIGS. 1 and 2, the horizontal section 34 is made from inner sections 11 and outer sections 12. At least two outer pieces 12 are designed to fit over the top of the buttons 15 on the inner section. When the horizontal portion 34 is extended, as shown in FIG. 2, outer sections 12 are held in place by the buttons. When the support bar 10 is collapsed, as shown in FIG. 2, they meet equally near the center of the inner portion and cover the collapsible buttons 15.

FIG. 4 shows another embodiment of the present invention in which the decoy device 25 comprises a plurality of horizontal portions 26 formed by collapsible support bars arranged at the top of the telescoping vertical portion 28. These collapsible support bars are shown in the extended position, with the outer members 40 covering collapsible buttons 42 located on inner sections 41. Both the inner portions 41 and the outer portions 40 are provided with openings 27 to receive a decoy equipped with a dowel. The vertical portion 28 is provided with a stake 29 so that the device can be firmly placed into the ground.

FIG. 5 shows yet another embodiment of the present invention in which two telescoping poles 50 are placed in the ground by stakes 51 and at least one collapsible support 52 is strung between the two poles. The collapsible support 52, which is shown in the extended position, includes an inner portion 53 and an outer portion 54. Both inner and outer portions are equipped with openings 55 into which a dowel or other such structure can fit. The outer portions 54 are also provided with holes 57 which can fit over the telescoping poles 50.

The number of drilled holes provided in the inner bar and outer portions is generally chosen based upon the size of the decoys, bird feeders, or plant holders to be carried by the collapsible support bar. For purposes of stability, it is preferable that the drilled holes be spaced approximately equidistant from each other.

As noted above, the structure comprising the collapsible support bar and the vertical pole may be used to attach bird feeders or plant containers which are equipped with dowels to fit into the drilled holders on the collapsible support bar.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehend within the meaning and range of equivalents of the disclosed embodiments. It is to be understood that the phraseology or terminology employed herein is for the purpose of description and not of limitation. The means, materials, and steps for carrying out various disclosed function; may take a variety of alternative forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment to embodiments disclosed in the specification above, i.e., other means or steps for carrying out the same function can be used; and it is intended that such expressions be given their broadest interpretation.

What is claimed is:

1. An apparatus for luring birds for hunting comprising:
   a telescopic vertical pole with an attached stake at the bottom thereof;
   at least one collapsible support bar at the top of the vertical pole which is expandable horizontally to create a T-like structure with the vertical pole;
   at least one collapsible support bar comprising an inner bar and outer portions, said inner bar is provided with collapsible buttons which retain the outer portions in position on the inner bar when in a collapsed position and which retain the outer portions in positions on the inner bar when in the extended position,
   wherein both the inner bar and the outer portions are provided with drilled holes into which dowels can be inserted; and
   decoys provided with dowels to fit into the drilled holes.

2. The apparatus according to claim 1 wherein a plurality of collapsible support bars are provided on one vertical pole.

3. The apparatus according to claim 1 wherein the drilled holes are drilled completely through the inner bar and the outer portions.

* * * * *